United States Patent
Mordukhovich

(10) Patent No.: US 12,252,018 B1
(45) Date of Patent: Mar. 18, 2025

(54) ELECTRIC DRIVE MODULE HAVING DUAL ELECTRIC MOTORS AND PLANETARY GEARSET

(71) Applicant: FCA US LLC, Auburn Hills, MI (US)

(72) Inventor: Gregory Mordukhovich, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/455,879

(22) Filed: Aug. 25, 2023

(51) Int. Cl.
  *B60K 6/365* (2007.10)
  *B60K 6/383* (2007.10)
  *B60K 6/442* (2007.10)

(52) U.S. Cl.
  CPC .............. *B60K 6/442* (2013.01); *B60K 6/365* (2013.01); *B60K 6/383* (2013.01)

(58) Field of Classification Search
  CPC ......... B60K 6/442; B60K 6/365; B60K 6/383
  See application file for complete search history.

(56) References Cited

U.S. PATENT DOCUMENTS

| | | | | |
|---|---|---|---|---|
| 10,618,516 B2 * | 4/2020 | Daley | ................. | B60W 30/143 |
| 2021/0188066 A1 * | 6/2021 | McGrew | ................. | B60K 1/02 |
| 2021/0402864 A1 * | 12/2021 | Van Maanen | .......... | B60K 6/383 |

FOREIGN PATENT DOCUMENTS

| | | | | | |
|---|---|---|---|---|---|
| CN | 108032857 A | * | 5/2018 | ............ | B60W 10/08 |
| JP | 6844268 B2 | * | 3/2021 | ............. | B60L 15/20 |
| KR | 20190137995 A | * | 12/2019 | ............. | B60K 6/365 |
| KR | 20190140248 A | * | 12/2019 | ............. | B60K 6/365 |
| KR | 20200006664 A | * | 1/2020 | ............. | B60K 6/365 |
| WO | WO-2008129390 A2 | * | 10/2008 | ............. | B60K 6/365 |

* cited by examiner

*Primary Examiner* — Tisha D Lewis
(74) *Attorney, Agent, or Firm* — Jeremy J. Klobucar

(57) ABSTRACT

An electrified powertrain that generates and transfers drive torque to a driveline of an electrified vehicle is provided. The electrified powertrain includes an electric drive module (EDM), a driveline input and a controller. The EDM includes a first electric motor, a second electric motor and a planetary gear set. The planetary gear set has a sun gear fixed for rotation with an output of the first electric motor, a carrier fixed for rotation with an output of the second electric motor, at least two planetary gears rotatably disposed on the carrier and a ring gear. The driveline input gear is driven by the ring gear and delivers torque to drive wheels. The controller controls operation of the first and second electric motors to alter a rotation of the ring gear and drive the driveline input gear based on operating conditions.

17 Claims, 7 Drawing Sheets

| | ICE 140 | EM1 116A | EM2 116B | COWC A 160 | COWC B 162 | COWC C 164 | D 156 |
|---|---|---|---|---|---|---|---|
| Launch 312 | | X | X | | | | X |
| Cruise 1 314 | | X | | | | X | X |
| Cruise 2 316 | | X | X | | X | | X |
| Max Power Max Speed 318 | | X | | | | | X |
| Regen 320 | | X | | | | | X |
| Direct Drive 322 | X | | | X | | | X |
| Reverse 324 | | | | | | X | X |
| Direct Drive with charging 326 | X | X | | X | | | X |
| PHEV 1 328 | X | X | X | X | | X | X |
| PHEV 2 330 | X | X | X | X | X | | X |
| PHEV 3 332 | X | X | X | X | | | X |

FIG. 3

|  | EM1 116A | EM2 116B | COWC B 162 | COWC C 164 |
|---|---|---|---|---|
| Launch 412 | X | X | | |
| Cruise 1 414 | X | | | X |
| Cruise 2 416 | | X | X | |
| Max Power Max Speed 418 | X | X | | |
| Regen 420 | X | | | X |
| Reverse 424 | | | | |
| Direct Drive with charging 426 | X | | | X |

|  | EM1 116A | EM2 116B | COWC B 162 | COWC C 164 |
|---|---|---|---|---|
| 512 → Launch | X | X | | |
| 514 → Cruise 1 | X | | | X |
| 516 → Cruise 2 | | X | X | |
| 518 → Max Power Max Speed | X | X | | |
| 520 → Regen | X | | | X |
| 524 → Reverse | | | | |
| 526 → Direct Drive with charging | X | | | X |

ELECTRIC DRIVE MODULE HAVING DUAL ELECTRIC MOTORS AND PLANETARY GEARSET

FIELD

The present application generally relates to electrified vehicles and, more particularly, to an electric drive module having dual electric motors that cooperatively drive a planetary gear set that in turn provides drive torque to drive wheels of the electrified vehicle.

BACKGROUND

An electrified vehicle (hybrid electric, plug-in hybrid electric, range-extended electric, battery electric, etc.) includes at least one battery system and at least one electronic drive module having an electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive gearbox assembly can be configured in many ways to achieve various gear ratios for accessing during specific drive conditions. In some examples however it may be challenging to provide the most efficient torque input at different operating conditions while minimizing noise vibration and harshness (NVH) associated with such configurations. Accordingly, while such electronic drive modules do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module (EDM), a driveline input and a controller. The electric drive module includes a first electric motor, a second electric motor and a planetary gear set. The planetary gear set has a sun gear fixed for rotation with an output of the first electric motor, a carrier fixed for rotation with an output of the second electric motor, at least two planetary gears rotatably disposed on the carrier and a ring gear. The driveline input gear is driven by the ring gear and delivers torque to drive wheels. The controller controls operation of the first and second electric motors to alter a rotation of the ring gear and rive drive the driveline input gear based on operating conditions.

In some implementations, a transfer case has a transfer case output gear. The driveline input gear and the transfer case output gear provide a gear reduction between the ring gear and the drive wheels.

In some implementations, at least one of the first and second electric motors are induction motors.

In some implementations, a first one way clutch selectively engages, based on input from the controller, for rotation with the first electric motor. A second one way clutch selectively engages, based on input from the controller, for rotation with the second electric motor.

In some implementations, an internal combustion engine (ICE) selectively drives the driveline input gear. A third one way clutch selectively engages, based on input from the controller, for rotation with the ICE.

In additional aspects, the ring gear is free rotating relative to a housing of the electric drive gearbox assembly.

In additional features, the first and second electric motors provide torque input during a launch mode. Only the first electric motor provides torque input during a first cruise mode. Only the second electric motor provides torque input during a second cruise mode. In implementations, the first output of the first electric motor and the second output of the second electric motor are oriented in a coaxial relationship.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 3 is a table illustrating various modes used by the hybrid electrified powertrain of FIG. 2;

FIG. 5 is a table illustrating various modes used by the fully electrified powertrain of FIG. 4;

FIG. 7 is a table illustrating various modes used by the fully electrified powertrain of FIG. 6.

DESCRIPTION

As discussed above, an electric drive gearbox assembly can be configured in many ways to achieve various gear ratios available during specific drive conditions. In some examples however it may be challenging to provide the most efficient torque input at different operating conditions while minimizing noise vibration and harshness (NVH) associated with such configurations.

The instant disclosure provides an electric drive module that incorporates two different electric motors. A first electric motor is targeted to high torque situations with a low speed driving range (such as launch, towing, etc.). A second electric motor is targeted for low torque situations with high speed driving range (such as highway, etc.). The first and second electric motors provide inputs to a planetary gear set as an alternative to a multispeed transmission with minimum hardware content and minimum torque interruption during shifting using the electric motors to achieve vehicle efficiency enhancement at low manufacturing cost and without appreciable NVH or drivability concerns.

Figure 1:
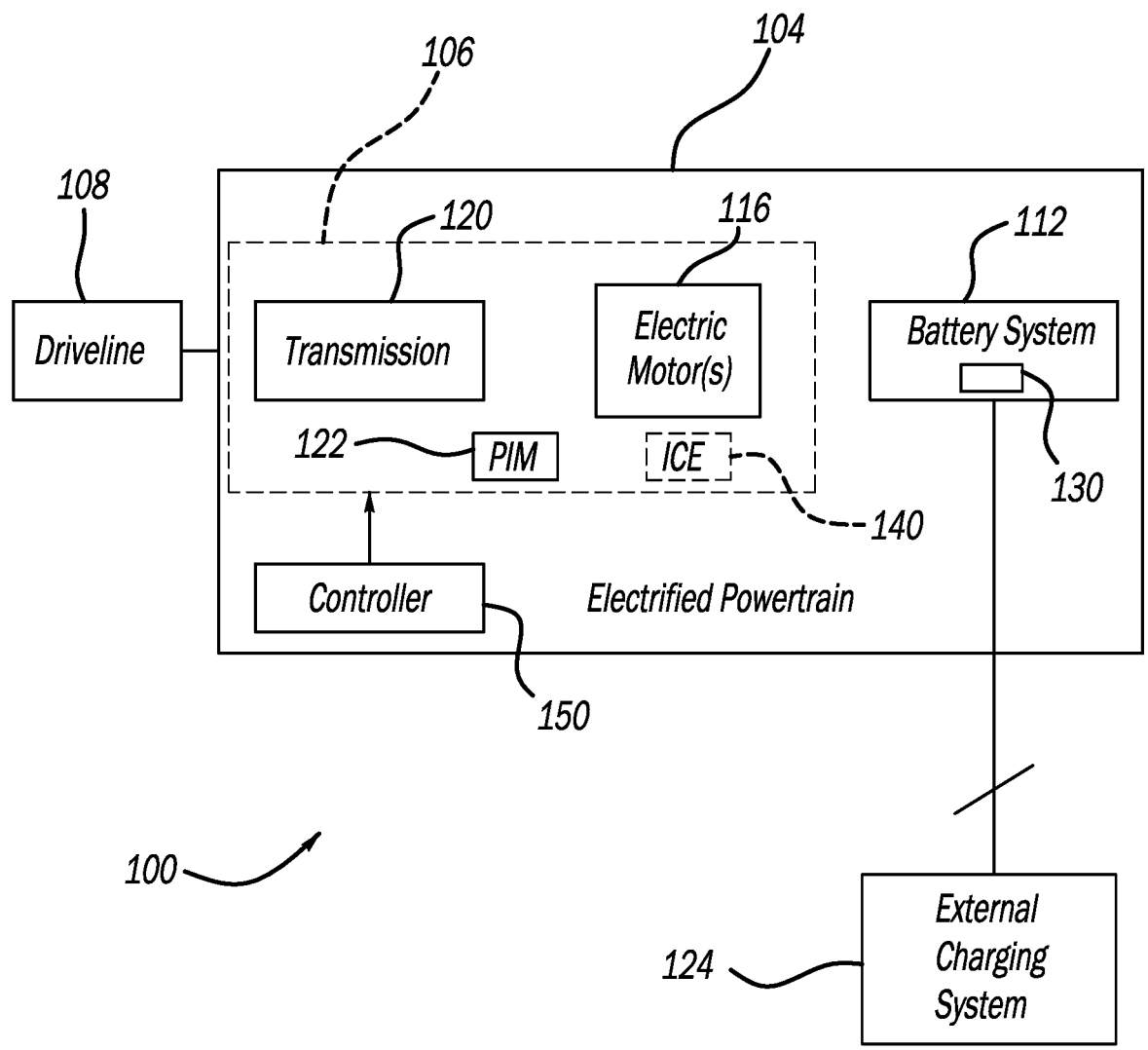
FIG. 1 is a functional block diagram of an electrified vehicle having an electronic drive module according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122.

The electric motor 116 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can by a hybrid powertrain that additionally includes an internal combustion engine 140. A controller 150 can provide various inputs to the EDM 106 related to selectively switching power inputs between the electric motors 116 and the ICE 140.

Figure 2:
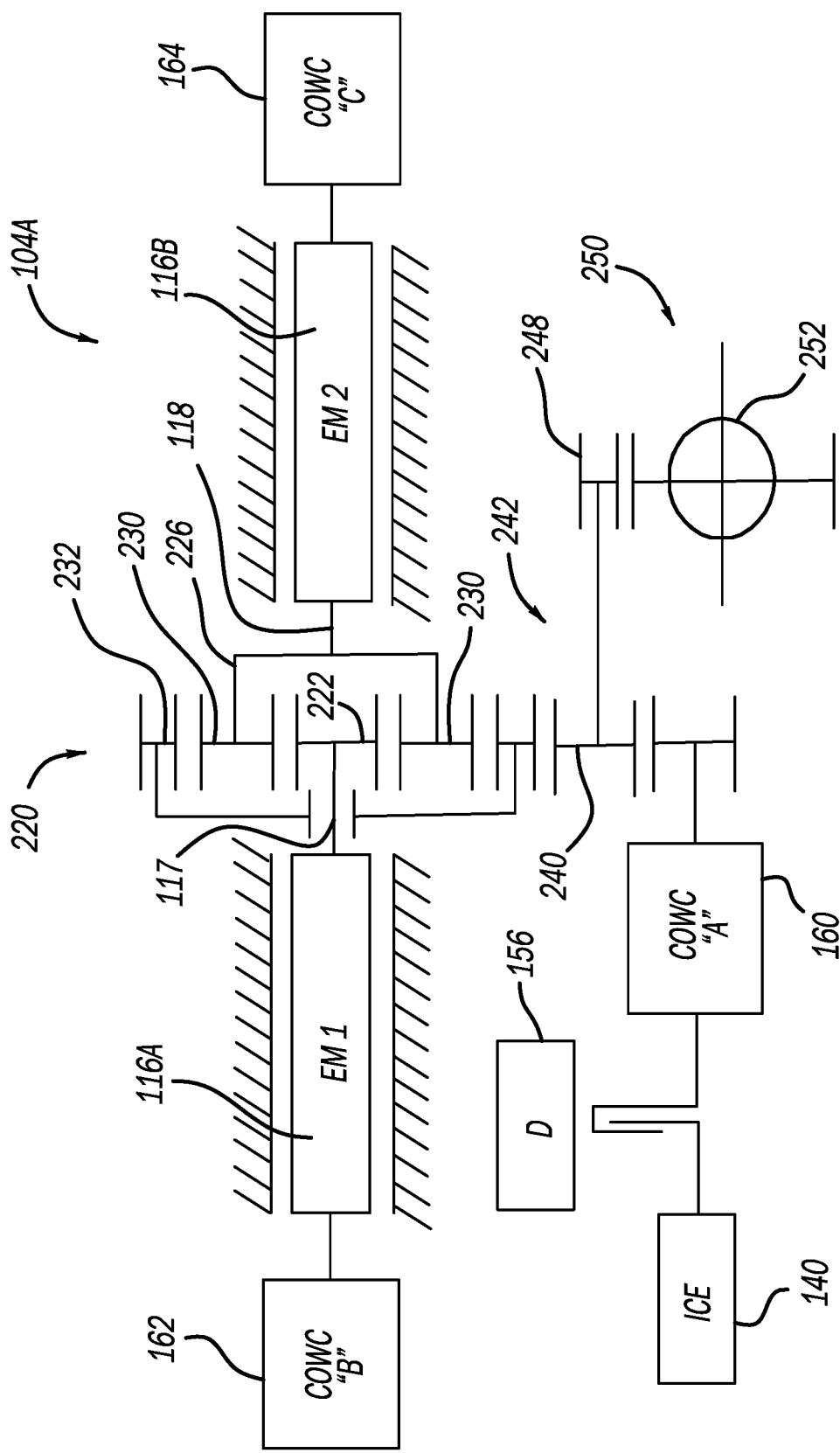
FIG. 2 is schematic illustration of a hybrid electrified powertrain that further includes an internal combustion engine according to various principles of the present application.

With additional reference now to FIG. 2, additional features of the EDM 106 will be further described for a hybrid electrified powertrain 104A that further includes the ICE 140 (such as a geared-neutral plug in hybrid electric vehicle or battery electric vehicle). The electric motors 116 include a first electric motor 116A having a first output 117 and a second electric motor 116B having a second output 118. The first and second drive motors 116A and 116B are arranged such that their respective outputs 117, 118 are coaxial providing efficient torque transfer. In examples, the first and second electric motors 116A and 116B can be induction motors to minimize drag.

The electric drive gearbox assembly 120 generally includes a case or housing (not specifically shown) that houses a planetary gear set 220. In the example shown, the planetary gear set 220 includes a sun gear 222, a planet carrier 226 that rotatably supports planet gears 230, and a ring gear 232. In advantages, the ring gear 232 is not fixed to a housing of the EDM 106 reducing noise vibration and harshness (NVH) characteristics. A controlled one way clutch COWC "A" 160 selectively engages to transfer drive power from the ICE 140, through a drive clutch 156 and into the transfer case 242. A COWC "B" 162 selectively engages to provide drive output from the first electric motor 116A to the sun gear 222. A COWC "C" 164 selectively engages to provide drive output from the second electric motor 116B to the carrier 226.

The first electric motor 116A is configured as a primary electric motor that can be generally used for primary propulsion of the vehicle 100 such as launch and highway accelerations. The second electric motor 116B is configured as a secondary motor and is used to position the first electric motor 116A in a preferred sweet spot suitable for optimal performance. An output of the first electric motor 116A is fixed for rotation with the sun gear 222. An output of the second electric motor 116B is fixed to the carrier 226. When the carrier 226 is stationary, an input of the sun gear 222 will output to the ring gear 232, providing the drive ratio reduction. The ring gear 232 provides a rotatable input to a transfer case input gear 240 of a transfer case 242. An output of the transfer case 242 includes a transfer case output gear 248 that can drive output wheels 250, such as through a differential 252. The transfer case input gear 240 and transfer case output gear 248 cooperate to provide a further gear reduction.

When the second electric motor 116B provides a rotatable input to the carrier 226, the output speed of the ring gear 232 is increased or decreased. Torque therefore is altered accordingly. By using the second electric motor 116B as an additional rotatable input to the carrier 226, a desired sweet spot or output speed of the ring gear 232 can be achieved. The speeds (and directions) of the first and second electric motors 116A, 116B, as well as opening and closing the respective COWC's 160, 162 and 164, are determined by inputs from the controller 150 based on operating conditions of the vehicle 100.

With additional reference to FIG. 3, a table 310 of exemplary use scenarios of the electrified powertrain 104A is shown. In examples, during mode 312, or launch, both of the first and second electric motors 116A, 116B can be used to provide a positive drive torque to the ring gear 232 and therefore the transfer case 242 and output wheels 250. During mode 314, or Cruise 1, only the first electric motor 116A can be used to provide drive torque to the drive wheels 250. During mode 314, the COWC "C" 164 is on. During mode 316, or Cruise 2, only the second electric motor 116B can be used to provide drive torque to the drive wheels 250. During mode 316, the COWC "B" 162 is on.

In examples, the second electric motor 116B may be sized to provide a more efficient means for powering the drive wheels 250 at highway speeds. Other use case scenarios are contemplated. During mode 318, or maximum power, maximum speed, both the first and second electric motors 116A, 116B are used as torque inputs to the drive wheels 250. During mode 320, or regeneration, only the first electric motor 116A is used. Regen can also be available with the second electric motor 116B with the COWC "B" 162 on as an option. During mode 320, the COWC "C" 164 is on. During mode 322, or direct drive, only the internal combustion engine 140 is used.

During mode 324, or reverse, the drive clutch 156 is selected. Any of the ICE 140, the first electric motor 116A and/or the second electric motor 116B can be used to power the vehicle 100. During mode 326 or direct drive with charging, the ICE 140 and the first electric motor 116A can be used as input. The COWC "C" 164 is on. During mode 328, or plug in hybrid electric vehicle PHEV 1, the ICE 140 and the first electric motor 116A are used as torque inputs The COWC "A" 160 and the COWC "C" 164 are on. During mode 330, or PHEV 2, the ICE 140 and the second electric motor 116B are used as torque inputs The COWC "A" 160 and the COWC "B" 162 are on. During mode 332, or PHEV 3, the ICE 140, the first electric motor 116A and the second electric motor 116B are used as torque inputs The COWC "A" 160 is on.

Figure 4:
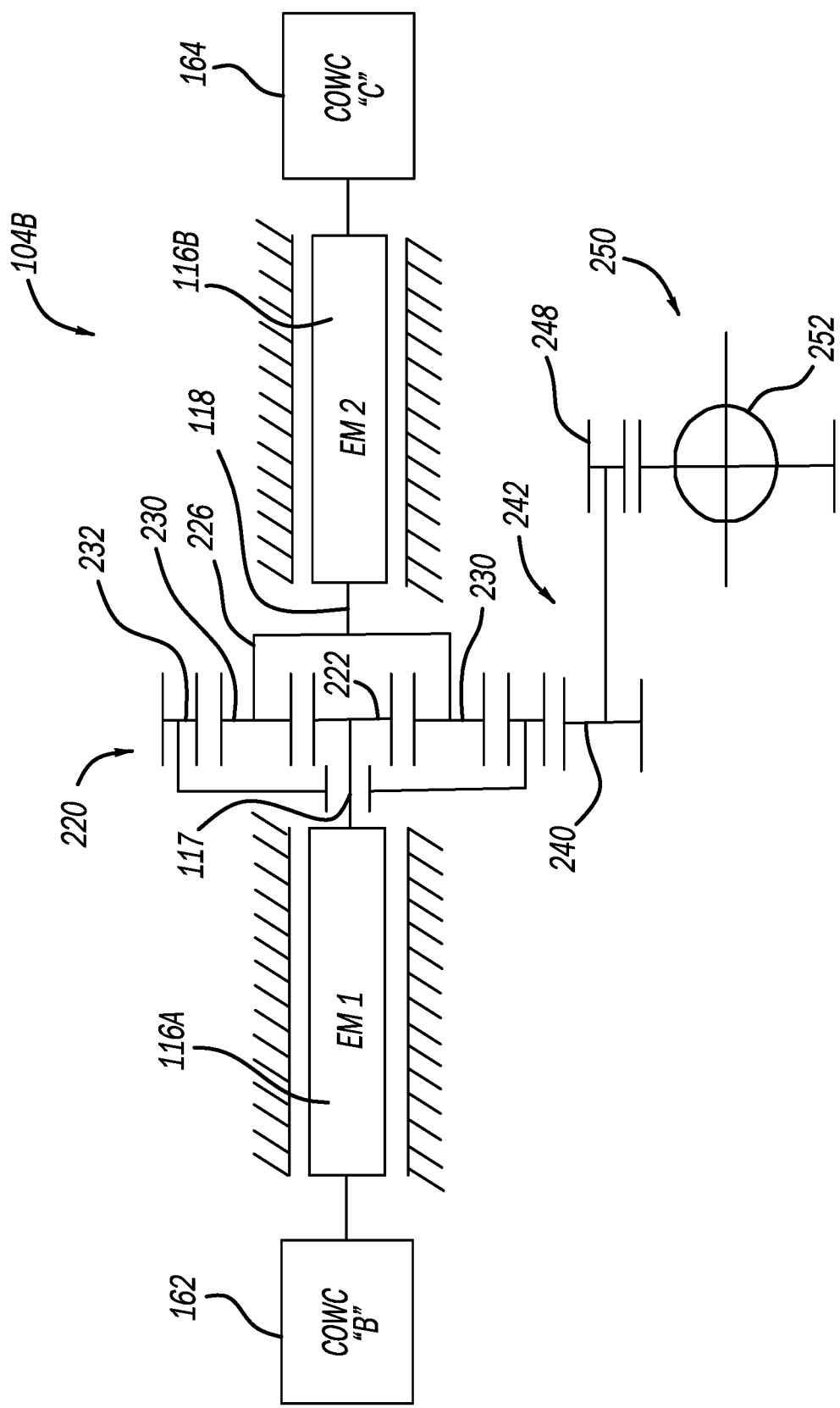
FIG. 4 is schematic illustration of fully electrified powertrain that incorporates a further gear reduction at a transfer case according to various principles of the present application.

With additional reference now to FIG. 4, additional features of the EDM 106 will be further described for a fully electrified powertrain 104B that does not include an ICE (such as a geared-neutral battery electric vehicle). The electrified powertrain 104B includes an additional gear reduction through the transfer case as will be described. The electric motors 116 include a first electric motor 116A and a second electric motor 116B. The electric drive gearbox assembly 120 generally includes a case or housing (not specifically shown) that houses a planetary gear set 220. In the example shown, the planetary gear set 220 includes a sun gear 222, a planet carrier 226 that rotatably supports planet gears 230, and a ring gear 232. A COWC "B" 162 selectively engages to provide drive output from the first electric motor 116A to the sun gear 222. A COWC "C" 164 selectively engages to provide drive output from the second electric motor 116B to the carrier 226.

The first electric motor 116A is configured as a primary electric motor that can be generally used for primary propulsion of the vehicle 100 such as launch and highway accelerations. The second electric motor 116B is configured as a secondary motor and is used to position the first electric motor 116A in a preferred sweet spot suitable for optimal performance. An output of the first electric motor 116A is fixed for rotation with the sun gear 222. An output of the second electric motor 116B is fixed to the carrier 226. When the carrier 226 is stationary, an input of the sun gear 222 will output to the ring gear 232, providing the drive ratio reduction. The ring gear 232 provides a rotatable input to a driveline input or transfer case input gear 240 of a transfer case 242. An output of the transfer case 242 includes a transfer case output gear 248 that can drive output wheels 250, such as through a differential 252.

When the second electric motor 116B provides a rotatable input to the carrier 226, the output speed of the ring gear 232 is increased or decreased. Torque therefore is altered accordingly. By using the second electric motor 116B as an additional rotatable input to the carrier 226, a desired sweet spot or output speed of the ring gear 232 can be achieved. The speeds (and directions) of the first and second electric motors 116A, 116B as well as opening and closing the respective COWC's 162 and 164, are determined by inputs from the controller 150 based on operating conditions of the vehicle 100.

With additional reference to FIG. 5, a table 410 of exemplary use scenarios of the electrified powertrain 104B is shown. In examples, during mode 412, or launch, both of the first and second electric motors 116A, 116B can be used to provide a positive drive torque to the ring gear 232 and therefore the transfer case 242 and output wheels 250. During mode 414, or Cruise 1, only the first electric motor 116A can be used to provide drive torque to the drive wheels 250. During mode 414, the COWC "C" 164 is on. During mode 416, or Cruise 2, only the second electric motor 116B can be used to provide drive torque to the drive wheels 250. During mode 416, the COWC "B" 162 is on.

In examples, the second electric motor 116B may be sized to provide a more efficient means for powering the drive wheels 250 at highway speeds. Other use case scenarios are contemplated. During mode 418, or maximum power, maximum speed, both the first and second electric motors 116A, 116B are used as torque inputs to the drive wheels 250. During mode 420, or regeneration, only the first electric motor 116A is used. Regen can also be available with the second electric motor 116B with the COWC "B" 162 on as an option. During mode 420, the COWC "C" 164 is on.

During mode 424, or reverse, either of the first electric motor 116A and/or the second electric motor 116B can be used to power the vehicle 100. During mode 426 or direct drive with charging, the ICE 140 and the first electric motor 116A can be used as input. The COWC "C" 164 is on.

Figure 6:
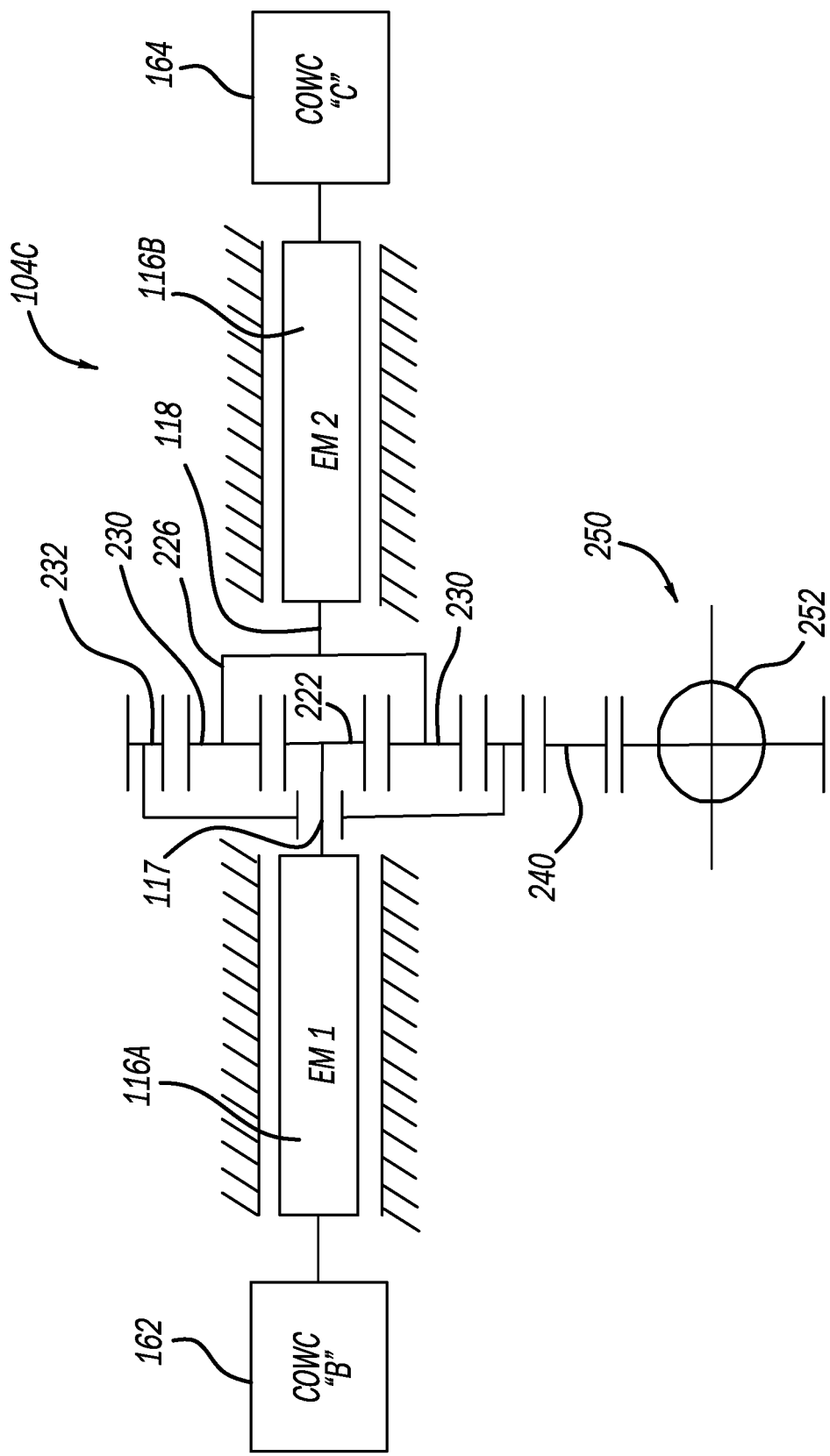
FIG. 6 is schematic illustration of a fully electrified powertrain that does not include a further gear reduction according to various principles of the present application.

With additional reference now to FIG. 6, additional features of the EDM 106 will be further described for a fully electrified powertrain 104C that does not include an ICE (such as a geared-neutral battery electric vehicle) and does not include a supplemental gear reduction (such as provided by a transfer case 242 described in relation to FIGS. 2 and 4 above). The electric motors 116 include a first electric motor 116A and a second electric motor 116B. The electric drive gearbox assembly 120 generally includes a case or housing (not specifically shown) that houses a planetary gear set 220. In the example shown, the planetary gear set 220 includes a sun gear 222, a planet carrier 226 that rotatably supports planet gears 230, and a ring gear 232. A COWC "B" 162 selectively engages to provide drive output from the first electric motor 116A to the sun gear 222. A COWC "C" 164 selectively engages to provide drive output from the second electric motor 116B to the carrier 226.

The first electric motor 116A is configured as a primary electric motor that can be generally used for primary propulsion of the vehicle 100 such as launch and highway accelerations. The second electric motor 116B is configured as a secondary motor and is used to position the first electric motor 116A in a preferred sweet spot suitable for optimal performance. An output of the first electric motor 116A is fixed for rotation with the sun gear 222. An output of the second electric motor 116B is fixed to the carrier 226. When the carrier 226 is stationary, an input of the sun gear 222 will output to the ring gear 232, providing the drive ratio reduction. The ring gear 232 provides a rotatable input through a driveline input 240 and ultimately to drive wheels 250, such as through the differential 252.

When the second electric motor 116B provides a rotatable input to the carrier 226, the output speed of the ring gear 232 is increased or decreased. Torque therefore is altered accordingly. By using the second electric motor 116B as an additional rotatable input to the carrier 226, a desired sweet spot or output speed of the ring gear 232 can be achieved. The speeds (and directions) of the first and second electric motors 116A, 116B as well as opening and closing the respective COWC's 162 and 164, are determined by inputs from the controller 150 based on operating conditions of the vehicle 100.

With additional reference to FIG. 7, a table 510 of exemplary use scenarios of the electrified powertrain 104C is shown. In examples, during mode 512, or launch, both of the first and second electric motors 116A, 116B can be used to provide a positive drive torque to the ring gear 232 and therefore to the output wheels 250. During mode 514, or Cruise 1, only the first electric motor 116A can be used to provide drive torque to the drive wheels 250. During mode 514, the COWC "C" 164 is on. During mode 516, or Cruise 2, only the second electric motor 116B can be used to provide drive torque to the drive wheels 250. During mode 516, the COWC "B" 162 is on.

In examples, the second electric motor 116B may be sized to provide a more efficient means for powering the drive wheels 250 at highway speeds. Other use case scenarios are contemplated. During mode 518, or maximum power, maximum speed, both the first and second electric motors 116A, 116B are used as torque inputs to the drive wheels 250. During mode 520, or regeneration, only the first electric motor 116A is used. Regen can also be available with the second electric motor 116B with the COWC "B" 162 on as an option. During mode 520, the COWC "C" 164 is on.

During mode 524, or reverse, either of the first electric motor 116A and/or the second electric motor 116B can be used to power the vehicle 100. During mode 526 or direct drive with charging, the ICE 140 and the first electric motor 116A can be used as input. The COWC "C" 164 is on.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
an electric drive module comprising:
a first electric motor having a first output;
a second electric motor having a second output; and
a planetary gear set having a sun gear fixed for rotation with the first output, a carrier fixed for rotation with the second output, at least two planetary gears rotatably disposed on the carrier, and a ring gear;
a driveline input gear that is driven by the ring gear and that delivers torque to drive wheels; and
a controller that controls operation of the first and second electric motors to alter a rotation of the ring gear that drives the driveline input gear based on operating conditions, wherein only the first electric motor provides torque input during a first cruise mode and wherein only the second electric motor provides torque input during a second cruise mode.

2. The electrified powertrain of claim 1, further comprising:
a transfer case having a transfer case output gear, wherein the driveline input gear and the transfer case output gear provide a gear reduction between the ring gear and the drive wheels.

3. The electrified powertrain of claim 1, wherein at least one of the first and second electric motors are induction motors.

4. The electrified powertrain of claim 1, further comprising a first one way clutch that selectively engages, based on input from the controller, for rotation with the first electric motor.

5. The electrified powertrain of claim 4, further comprising a second one way clutch that selectively engages, based on input from the controller, for rotation with the second electric motor.

6. The electrified powertrain of claim 1, further comprising:
an internal combustion engine (ICE) that selectively drives the driveline input gear.

7. The electrified powertrain of claim 5, further comprising a third one way clutch that selectively engages, based on input from the controller, for rotation with the ICE.

8. The electrified powertrain of claim 1, wherein the ring gear is free rotating relative to a housing of the electric drive gearbox assembly.

9. The electrified powertrain of claim 1, wherein the first and second electric motors provide torque input during a launch mode.

10. The electrified powertrain of claim 1, wherein the first output of the first electric motor and the second output of the second electric motor are oriented in a coaxial relationship.

11. An electrified powertrain that generates and transfers drive torque to a driveline of an electrified vehicle, the electrified powertrain comprising:
an electric drive module comprising:
a first electric motor having a first output;
a second electric motor having a second output; and
a planetary gear set having a sun gear fixed for rotation with the first output, a carrier fixed for rotation with the second output, at least two planetary gears rotatably disposed on the carrier, and a ring gear;
an internal combustion engine (ICE) that selectively drives a driveline input gear that is driven by the ring gear and that delivers torque to drive wheels; and
a controller that controls operation of the first and second electric motors to achieve a desired rotation of the driveline input gear based on operating conditions, wherein only the first electric motor provides torque input during a first cruise mode and wherein only the second electric motor provides torque input during a second cruise mode.

12. The electrified powertrain of claim 11, wherein at least one of the first and second electric motors are induction motors.

13. The electrified powertrain of claim 11, further comprising a first one way clutch that selectively engages, based on input from the controller, for rotation with the first electric motor.

14. The electrified powertrain of claim 13, further comprising a second one way clutch that selectively engages, based on input from the controller, for rotation with the second electric motor.

15. The electrified powertrain of claim 14, further comprising a third one way clutch that selectively engages, based on input from the controller, for rotation with the ICE.

16. The electrified powertrain of claim 11, wherein the ring gear is free rotating relative to a housing of the electric drive gearbox assembly.

17. The electrified powertrain of claim 11, wherein the first output of the first electric motor and the second output of the second electric motor are oriented in a coaxial relationship.

* * * * *